(12) United States Patent
Dudebout et al.

(10) Patent No.: US 9,080,770 B2
(45) Date of Patent: Jul. 14, 2015

(54) REVERSE-FLOW ANNULAR COMBUSTOR FOR REDUCED EMISSIONS

(75) Inventors: Rodolphe Dudebout, Phoenix, AZ (US); Veeraraghave Raju Hasti, Karnataka (IN); Terrel Kuhn, Mesa, AZ (US); Sunil James, Chandler, AZ (US); Mario Scaini, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1020 days.

(21) Appl. No.: 13/154,208

(22) Filed: Jun. 6, 2011

(65) Prior Publication Data

US 2012/0304647 A1 Dec. 6, 2012

(51) Int. Cl.
| | |
|---|---|
| *F02C 1/00* | (2006.01) |
| *F02G 3/00* | (2006.01) |
| *F23R 3/06* | (2006.01) |
| *F23R 3/54* | (2006.01) |

(52) U.S. Cl.
CPC ... *F23R 3/06* (2013.01); *F23R 3/54* (2013.01); *F23R 2900/03041* (2013.01); *Y02T 50/675* (2013.01)

(58) Field of Classification Search
CPC .............. F23R 3/002; F23R 3/04; F23R 3/06; F23R 3/08; F23R 3/007; F23R 3/10; Y02T 50/675
USPC .................................... 60/752–760
See application file for complete search history.

(56) References Cited

U.S. PATENT DOCUMENTS

| | | | | |
|---|---|---|---|---|
| 2,930,192 | A * | 3/1960 | Johnson ......................... | 60/746 |
| 4,891,936 | A | 1/1990 | Shekleton et al. | |
| 5,966,926 | A | 10/1999 | Shekleton et al. | |
| 5,996,351 | A | 12/1999 | Feitelberg et al. | |
| 6,543,231 | B2 | 4/2003 | Stuttaford et al. | |
| 6,684,642 | B2 | 2/2004 | Willis et al. | |
| 6,955,053 | B1 | 10/2005 | Chen et al. | |
| 7,093,441 | B2 | 8/2006 | Burd et al. | |
| 7,624,577 | B2 * | 12/2009 | Patel et al. ...................... | 60/752 |
| 7,770,397 | B2 * | 8/2010 | Patel et al. ...................... | 60/752 |
| 2006/0272335 | A1 * | 12/2006 | Schumacher et al. .......... | 60/804 |
| 2008/0104962 | A1 | 5/2008 | Patel et al. | |
| 2009/0133404 | A1 | 5/2009 | Lai et al. | |
| 2009/0139239 | A1 * | 6/2009 | Zupanc et al. .................. | 60/740 |
| 2010/0218502 | A1 * | 9/2010 | Chila et al. ...................... | 60/752 |
| 2011/0120134 | A1 | 5/2011 | Hoke et al. | |
| 2012/0023964 | A1 | 2/2012 | Mehring | |

FOREIGN PATENT DOCUMENTS

EP 2224168 A2 9/2010

OTHER PUBLICATIONS

Feitelberg, A. S. et al.: "Design and Performance of a Low Btu Fuel Rich-Quench-Lean Gas Turbine Combustor" Department of Energy, Morgantown, WV. Morgantown Energy Technology Center, 1996.
Micklow, G. J. et al.: "Three Dimensional Calculation to Investigate the Effect of Swirl Vane Design on Fuel Injector/Combustor Performance. I—Fuel Distribution" AIAA, ASME, SAE, and ASEE, Joint Propulsion Conference and Exhibit, 32nd, Lake Buena Vista, FL; United States; Jul. 1-3, 1996.
Dudebout, R et al.: "Reverse-Flow Annular Combustor for Reduced Emissions" filed with the USPTO on Oct. 19, 2012 and assigned U.S. Appl. No. 13/656,219.
EP partial search report for EP 12168776.9-1602/2532963 dated May 2, 2015.

* cited by examiner

*Primary Examiner* — Craig Kim
(74) *Attorney, Agent, or Firm* — Ingrassia Fisher & Lorenz, P.C.

(57) ABSTRACT

A combustor for a gas turbine engine is provided. The combustor includes an inner liner; an outer liner circumscribing the inner liner; and a combustor dome having a first edge coupled to the inner liner and a second edge coupled to the outer liner. The combustor dome forms a combustion chamber with the inner liner and the outer liner. The combustion chamber receives air flow through the inner and outer liners, and the combustor dome is configured to bifurcate the air flow at the combustor dome into a first stream directed to the inner liner and a second stream directed to the outer liner.

19 Claims, 8 Drawing Sheets

REVERSE-FLOW ANNULAR COMBUSTOR FOR REDUCED EMISSIONS

TECHNICAL FIELD

The present invention generally relates to gas turbine engines, and more particularly relates to rich burn, quick quench, lean burn (RQL) reverse-flow annular combustors for gas turbine engines that provide reduced emissions.

BACKGROUND

A gas turbine engine may be used to power aircraft or various other types of vehicles and systems. Such engines typically include a compressor that receives and compresses incoming gas such as air; a combustor in which the compressed gas is mixed with fuel and burned to produce high-pressure, high-velocity exhaust gas; and one or more turbines that extract energy from the exhaust gas exiting the combustor.

There is an increasing desire to reduce gaseous pollutant emissions, particularly oxides of nitrogen (NOx), that form during the combustion process. One approach to reduce NOx emissions is the implementation of a rich burn, quick quench, lean burn (RQL) combustion concept. A combustor configured for RQL combustion includes three serially arranged combustion zones: a rich burn zone at the forward end of the combustor, a quench zone downstream of the rich burn zone, and a lean burn zone downstream of the quench zone. By precisely controlling the stoichiometry between the air and fuel in each of these zones, NOx emissions can be minimized. In addition to reducing emissions, combustor designers further attempt to manage the temperature characteristics of the combustion process, which is particularly difficult in an RQL combustor. High temperatures may cause thermal stresses and other problems. While increased cooling flows may improve cooling, such additional air flow may interfere with the stoichiometries of the RQL combustion process.

Accordingly, it is desirable to provide improved RQL combustors in gas turbine engines with improved NOx emission and temperature characteristics. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for a gas turbine engine is provided. The combustor includes an inner liner; an outer liner circumscribing the inner liner; and a combustor dome having a first edge coupled to the inner liner and a second edge coupled to the outer liner. The combustor dome forms a combustion chamber with the inner liner and the outer liner. The combustion chamber receives air flow through the inner and outer liners, and the combustor dome is configured to bifurcate the air flow at the combustor dome into a first stream directed to the inner liner and a second stream directed to the outer liner.

In accordance with another exemplary embodiment, a combustor for a gas turbine engine with an engine centerline is provided. The combustor includes an inner liner; an outer liner circumscribing the inner liner; and a combustor dome having a first edge coupled to the inner liner and a second edge coupled to the outer liner. The combustor dome forms a combustion chamber with the inner liner and the outer liner, and the combustion chamber defines a rich burn zone, a quench zone, and a lean burn zone to support combustion of air flow through to inner liner and the outer liner. The combustor further includes a first row of air admission holes in the inner liner configured to admit a first set of quench jets into the quench zone; a second row of air admission holes in the outer liner configured to admit a second set of quench jets into the quench zone, the first row of air admission holes being circumferentially offset relative to the second row of air admission holes; a third row of air admission holes in the inner liner configured to admit a first set of dilution jets into the dilution zone; and a fourth row of air admission holes in the outer liner configured to admit a second set of dilution jets into the dilution zone. A fuel injector is coupled to the outer liner and configured to inject a stream of fuel into the combustion chamber in a tangential direction relative to the engine centerline.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, the exemplary embodiments discussed herein provide a gas turbine engine with a rich burn, quick quench, lean burn (RQL) combustor having improved NOx emissions and temperature characteristics. Particularly, in one exemplary embodiment, the combustor includes a combustor dome configured to bifurcate the combustion gases into a first combustion stream towards the inner liner and a second combustion stream toward the outer liner. The combustor may further include a fuel injector that injects a substantially tangential stream of fuel into the combustion chamber; quench air admission holes that admit a set of interleaved, over-penetrating quench jets; and a row of dilution air admission holes that admit a set of dilution jets. Embodiments discussed herein may find beneficial use in many industries and applications, including aerospace, automotive, and electricity generation.

Figure 1:
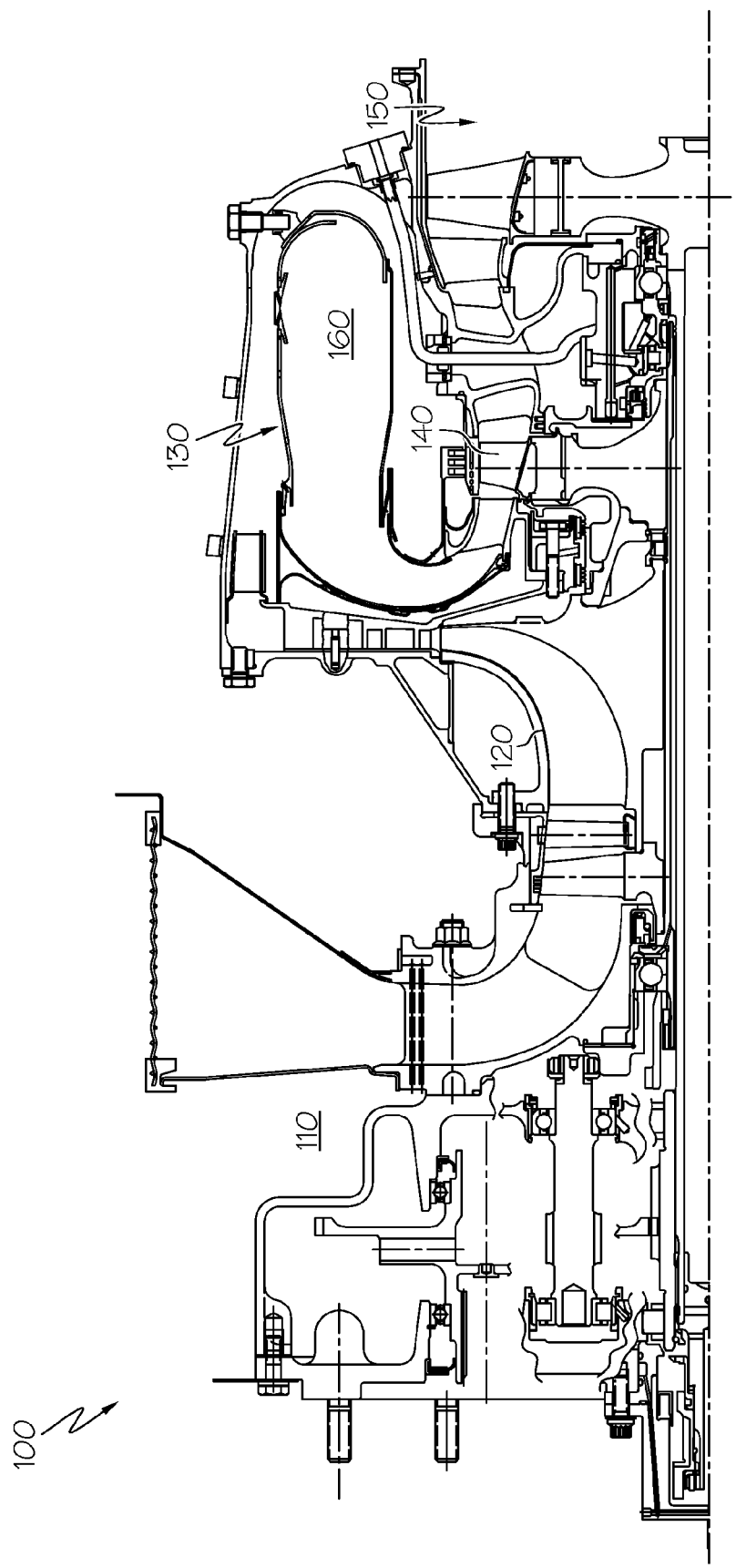
FIG. 1 is a cross-sectional view of a gas turbine engine in accordance with an exemplary embodiment.

FIG. 1 is a cross-sectional view of an engine 100 in accordance with an exemplary embodiment. In one embodiment, the engine 100 is a multi-spool gas turbine main propulsion engine. The engine 100 includes an intake section 110, a compressor section 120, a combustion section 130, a turbine section 140, and an exhaust section 150.

The intake section 110 receives air drawn into the engine 100 and directs the air into the compressor section 120. The compressor section 120 may include one or more compressors that raise the pressure of the air, and directs the compressed air into the combustion section 130. In the depicted embodiment, a two-stage compressor is shown, although it will be appreciated that one or more additional compressors could be used.

The combustion section 130, which is discussed in greater detail below, includes a combustor 160 that mixes the compressed air with fuel and ignites the resulting mixture to generate high energy combustion gases that are then directed into the turbine section 140. In one embodiment, the combustor 160 is implemented as a reverse flow combustor unit, although other embodiments may include a different type of combustor. The turbine section 140 includes one or more turbines in which the combustion gases from the combustion section 130 expand and rotate the turbines. The combustion gases are then exhausted through the exhaust section 150.

Figure 2:
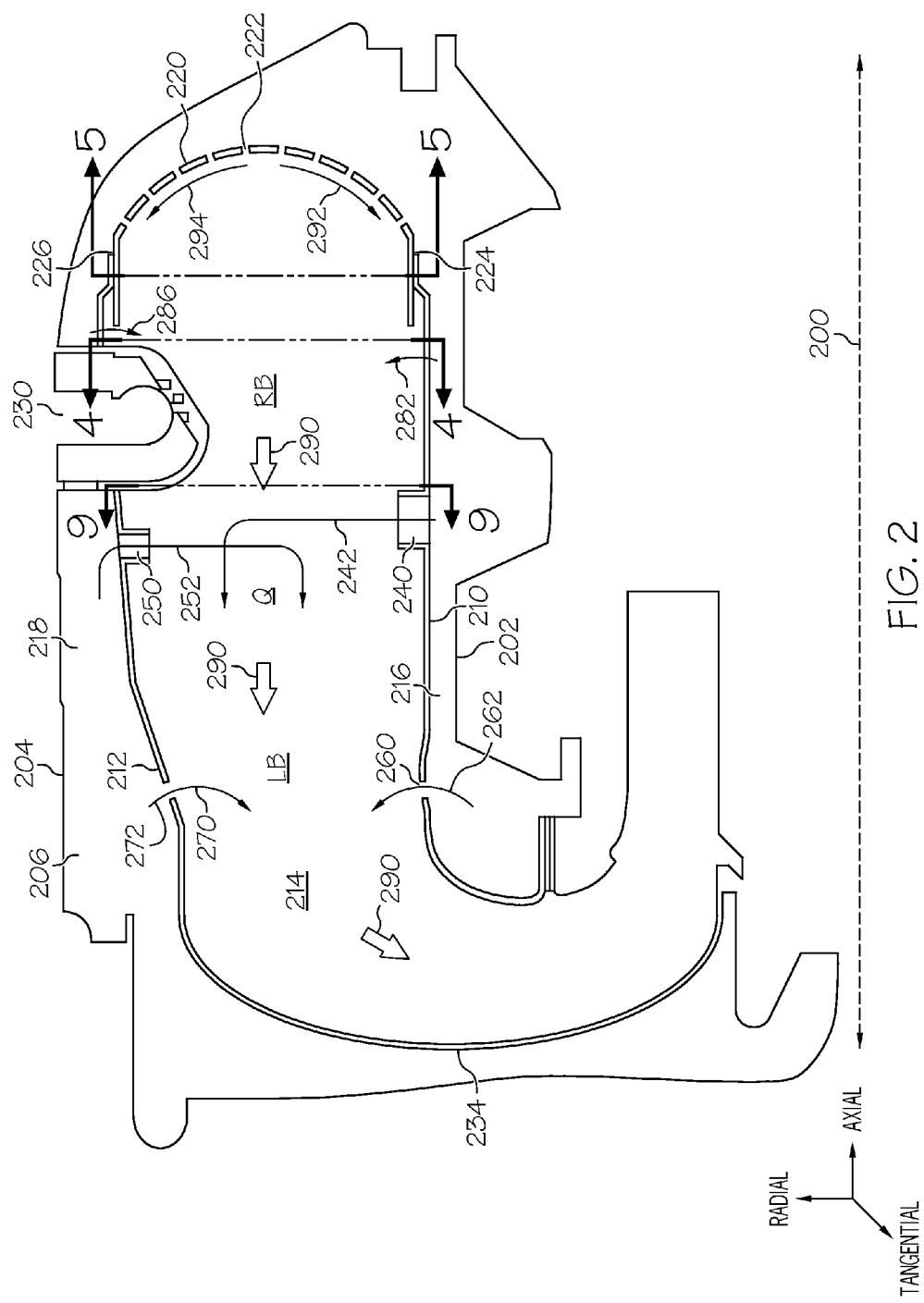
FIG. 2 is a more detailed cross-sectional view of a combustor of the engine of FIG. 1.

FIG. 2 is a more detailed cross-sectional view of a portion of the engine 100 of FIG. 1, and particularly illustrates the combustion section 130 of FIG. 1. In FIG. 2, only half the cross-sectional view is shown; the other half being substantially rotationally symmetric about a centerline and axis of rotation 200. In certain embodiments, the combustor 160 may be an annular rich burn, quick quench, lean burn (RQL) reverse-flow gas turbine engine combustor, as will now be described in more detail. In other embodiments, the combustor 160 may be another type of combustor.

The combustor 160 includes a radially inner case 202 and a radially outer case 204 concentrically arranged with respect to the inner case 202. The inner and outer cases 202 and 204 circumscribe the centerline 200 to define an annular pressure vessel 206. The combustor 160 is arranged within the annular pressure vessel 206. Particularly, the combustor 160 includes an inner liner 210 and an outer liner 212 circumscribing the inner liner 210. The liners 210 and 212 and cases 202 and 204 define respective inner and outer air plenums 216 and 218.

As described in further detail below, the combustor 160 further includes a combustor dome 220 respectively coupled to inner and outer liners 210 and 212 at a first (or inner) edge 224 and a second (or outer) edge 226. The inner liner 210, the outer liner 212, and the combustor dome 220 cooperate to form a combustion chamber 214 therebetween. The combustor 160 further includes a series of fuel injectors 230 (one of which is shown) coupled to the outer liner 212; quench air admission holes 240 and 250 respectively formed in the inner and outer liners 210 and 212; and dilution air admission holes 260 and 270 also respectively formed in the inner and outer liners 210 and 212. As noted above, the combustor 160 is an RQL combustor, and the various components of the combustor 160 cooperate to reduce NOx emissions.

During operation, a portion of the pressurized air from the compressor section 120 (FIG. 1) enters a rich burn zone RB of the combustion chamber 214 in the inner and outer liners 210 and 212. The pressurized air entering the rich burn zone RB is schematically shown in FIG. 2 as air flow 282 and 286. As described in further detail below, the fuel injectors 230 are arranged to supply fuel to the rich burn zone RB in a compound angular direction, which includes a radially inward direction toward the centerline 200, an axial direction toward the combustor dome 220, and a tangential direction about the circumference of the combustion chamber 214 to result in improved mixing of the fuel with the primary air jets 282 and 286. The air flow 282 and 286 intermixes with a stoichiometrically excessive quantity of fuel introduced through the fuel injectors 230 to support initial combustion in the rich burn zone RB. Although not shown, primary air admission holes and corresponding primary air jets may be provided.

FIG. 2 illustrates the main path of the combustion gases 290 flowing through the combustion chamber 214. The rich stoichiometry of the fuel-air mixture in the rich burn zone RB produces a relatively cool, oxygen-deprived flame, thus preventing excessive NOx formation and guarding against blowout of the combustion flame during any abrupt reduction in engine power.

As described in more detail below, the combustor dome 230 includes a number of effusion holes 222 to permit compressed air to pass therethrough as a cooling flow on the interior surface of the combustor dome 220. In particular, the effusion holes 222 allow a buffering layer of cooling air to pass from the exterior surface to the interior surface of the combustor dome 220, and then in a generally downstream direction with the hot combustion gases 290. This layer of cooling air reduces the direct contact of the hot combustion gases 290 with interior surface of the combustor dome 220 as well as convectively cools the wall of the combustor dome 220 as the air passes through the effusion holes 222. The durability of the combustor dome 220 may be extended by a reduction in temperature gradients along the surface.

As described in further detail below, the cooling air from the effusion holes 222 also functions to bifurcate combustor flow in the vicinity of the combustor dome 220 into an inner combustion stream 292 and an outer combustion stream 294. The combustor streams 292 and 294 are generally air flow, although fuel and/or combustion products (e.g., a portion of the combustion gases 290) may be included in the air flow streams 292 and 294. Generally, the inner combustor stream 292 flows towards the inner liner 210 (e.g., toward the engine centerline 200), and the outer combustion stream 294 flows towards the outer liner 212 (e.g., away from the engine centerline 200). Particularly, the arrangement of the effusion holes 222 may be used to influence the size and direction of the combustion streams 292 and 294, and thus, the combustion characteristics as desired. As an example, control of the cooling flows and the combustion streams 292 and 294 enable a more even and predictable combustion process. As shown, the split between the inner combustion stream 292 and the outer combustion stream 294 may be about even, e.g., 50% to 50%. However, in other embodiments, the split between the inner combustion stream 292 and the outer combustion stream 294 may be uneven, such as 60% to 40% or 70% to 30% in favor of either of the inner combustion stream 292 or the outer combustion stream 294. The effusion cooling produced by the effusion holes 222 becomes entrained with the inner and outer combustor streams 292 and 294 in the designated proportion such that the cooling air interaction with the combustion process in the rich-burn zone RB is minimized. As such, the combustor streams 292 and 294 may subsequently function as a coolant or an oxidizer in the combustion process.

The combustion gases 290 from the rich burn zone RB, which include unburned fuel, enter a quench zone Q. Quench jets 242 and 252 flow from the plenums 216 and 218 and into the quench zone Q through the quench air admission holes 240 and 250 in the inner and outer liners 210 and 212, respectively. The quench jets 242 and 252 are referred to as quench air because they rapidly mix the combustion gases 290 from a stoichiometrically rich state at the forward edge of the quench zone Q to a stoichiometrically lean state at, or just downstream of, the aft edge of the quench zone Q. This supports further combustion and releases additional energy from the fuel. Since thermal NOx formation is a strong time-at-temperature phenomenon, it is important that the fuel-rich mixture passing through the quench zone Q be mixed rapidly and thoroughly to a fuel-lean state in order to avoid excessive NOx generation. Thus, the design of the quench air jet arrangement in an RQL combustor is important to the successful reduction of NOx levels. As described below, the quench air admission holes 240 and 250 are arranged to produce interleaved and over-penetrating quench jets 242 and 252 for rapid mixing within the quench zone Q.

Finally, the combustion products from the quench zone Q enter a lean burn zone LB where the combustion process concludes. As the combustion gases 290 flow into the lean burn zone LB, the quench jets 242 and 252 are swept downstream and also continue to penetrate radially and spread out laterally to intermix thoroughly with the combustion gases 290. Additionally, dilution jets 262 and 272 flow from the plenums 216 and 218 through dilution air admission holes 260 and 270 respectively formed in the inner and outer liners 210 and 212 to result in a stoichiometrically lean quantity of fuel in the lean burn zone LB. The dilution air admission holes 260 and 270 additionally function to provide a desired temperature distribution and to complete the combustion process such that smoke and NOx emissions are reduced. In other exemplary embodiments, the dilution air admission holes 260 and 270 may be omitted. From the lean burn zone LB, the combustion gases 290 flow into the transition liner 234, which diverts the combustion gases 290 into the turbine section 140.

Figure 3:
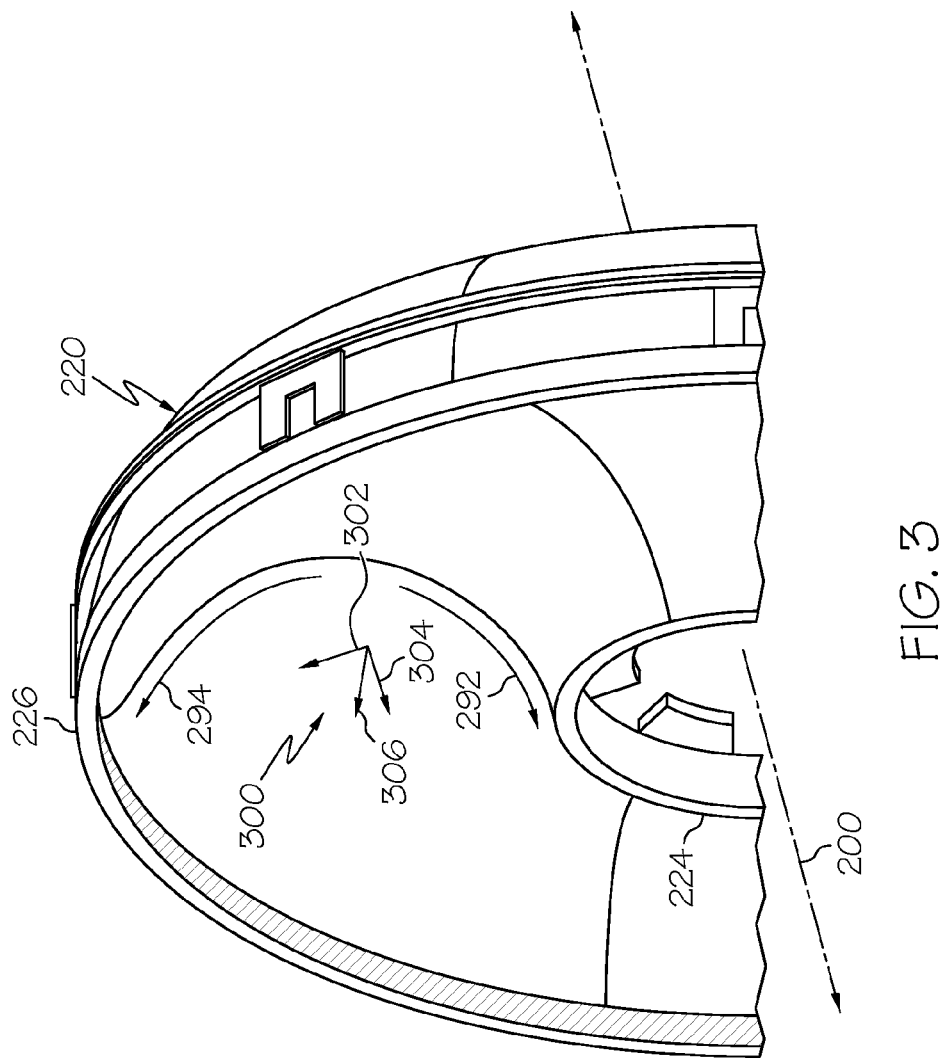
FIG. 3 is a partial isometric view of a combustor dome of the combustor of FIG. 2 in accordance with an exemplary embodiment.

FIG. 3 is a partial isometric view of a combustor dome 220 of the combustor 160 of FIG. 2 in accordance with an exemplary embodiment. Characteristics of the combustor dome 220 (and the combustor 160 of FIG. 2) can be considered in three dimensions, as indicted by the legend 300 and discussed further in FIGS. 4-9. A radial direction 302 extends between the first edge 224 and the second edge 226, generally perpendicular to the engine centerline 200. As an example, the bifurcated combustion streams 292 and 294 are depicted in the radial direction, particularly radially inward and outward within the annular configuration of the combustor dome 220. An axial direction 304 extends outwardly from the surface of the transition liner 210, generally parallel to the engine centerline 200. A tangential direction 306 extends around the surface of the combustion dome 220 and around the engine centerline 200. In this context, "tangential" refers to a vector flowing around the annular combustor dome 220 or the combustor 160 (FIG. 2).

Figure 4:
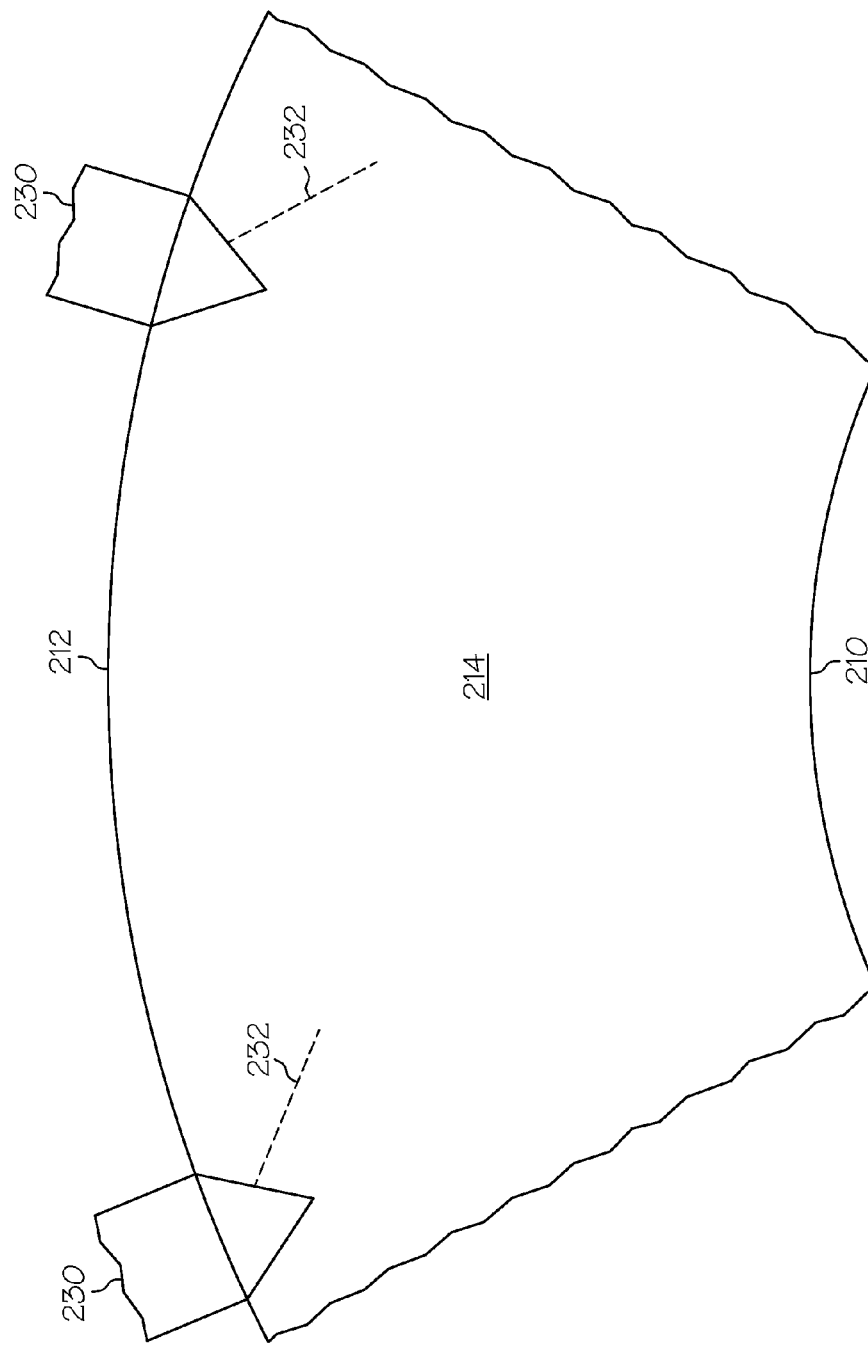
FIG. 4 is a partial cross-sectional view of the combustor of FIG. 2 through line 4-4.

FIG. 4 is a cross-sectional view of the combustor 160 of FIG. 2 through line 4-4. Particularly, FIG. 4 illustrates the fuel injectors 230 mounted on the outer liner 212 in the radial-tangential plane. The fuel injectors 230 may be equally angularly spaced about the annular combustion chamber 214 (FIG. 2). As noted above, the fuel injectors 230 may inject a portion of the fuel 232 at a compound angle, e.g., in FIG. 2, the fuel injectors 230 inject the fuel 232 in a radially inward direction toward the centerline 200 and in an axial direction toward the combustor dome 220. As further shown in FIG. 4, the fuel injectors 230 inject the fuel in tangential direction within the annular combustion chamber 214. The tangential component of the fuel 232 may promote blending and burn uniformity within the rich burn zone RB of the combustion chamber 214 (FIG. 2), which may enhance the cooling characteristics of the liners 210 and 212 and combustor dome 220, the NOx emissions characteristics, and the temperature distributions of the combustion gases 290 entering the turbine section 140 (FIG. 1). The fuel injectors 230 may be pressure-swirl or air blast injectors (or a combination thereof) and provided with airflow as necessary or desired to control smoke or other combustor characteristics. Although two fuel injectors 230 are shown in FIG. 3, any number may be provided.

Figure 5:
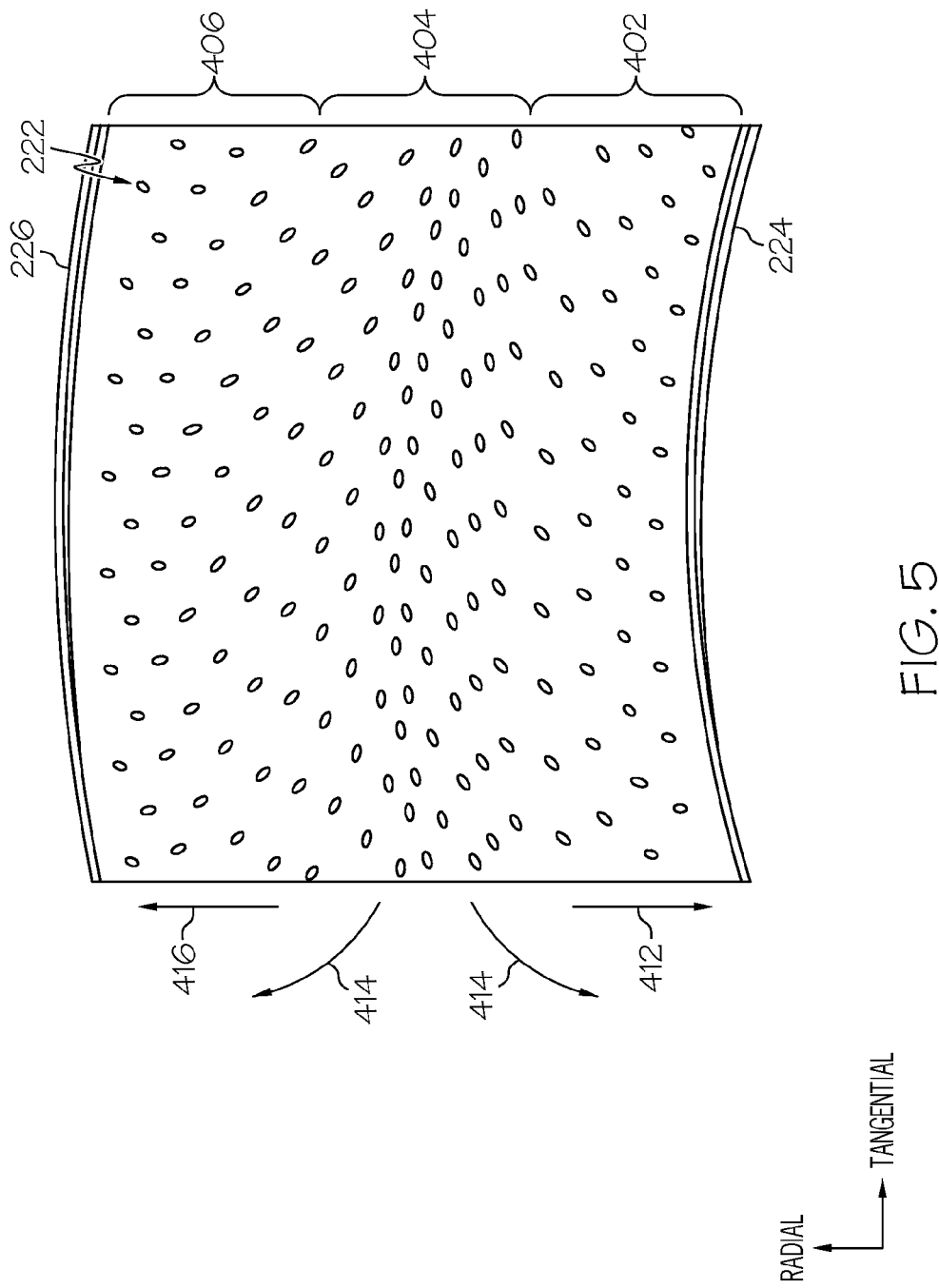
FIG. 5 is a partial cross-sectional view of the combustor of FIG. 2 through line 5-5 in accordance with a first exemplary embodiment.

FIG. 5 is a cross-sectional view of the combustor 160 of FIG. 2 through line 5-5 in accordance with a first exemplary embodiment. As noted above, the combustor dome 220 is configured as ring with a concave inner surface that faces the combustion chamber 214 (FIG. 2). FIG. 5 particularly illustrates a plan view of the combustor dome 220 in the radial-tangential plane and more clearly shows the effusion holes 222 that permit compressed air to pass through to the interior surface of the combustor dome 220. As discussed above, the effusion holes 222 are generally relatively small, closely spaced holes serving to direct a flow of cooling air onto the walls of combustor dome 220. The effusion holes 222 are generally 0.01 to 0.04 inches in diameter, although the diameter may vary with application and may depend on factors such as the dimensions of the combustor dome 220, the temperature of the combustion gases 290 (FIG. 2), and the velocity of the cooling flow. Individual hole shape is generally cylindrical or oval, with minor deviations due to manufacturing method, e.g., edge rounding, tapers, out-of-round, oblong, or the like. In other embodiments, the effusion holes may be non-cylindrical. For some applications, the effusion holes 222 may be uniformly spaced. Alternatively, the effusion holes 222 may be unevenly spaced to provide more tailored cooling flows.

As introduced above, the effusion holes 222 may be patterned to improve combustion characteristics, particularly the bifurcated combustion streams 292 and 294 (FIG. 2). In the embodiment of FIG. 4, the effusion holes 222 are generally arranged in groups 402, 404, and 406. A first group 402 of effusion holes 222 is adjacent the first edge 224 of the combustor dome 220 and the effusion holes 222 of the first group 402 have an orientation that is approximately completely radial. In other words, the first group 402 includes effusion holes 222 with angles of approximately 0° relative to a radial direction and can direct cooling air toward the inner edge 224, as indicated by arrow 412. As such, the arrow 412 corresponds to the direction of the cooling air from the first group 402 of effusion holes 222 and further corresponds to the inner combustion stream 292 of FIG. 2, which is encouraged in the depicted direction by the cooling air flowing through the first group 402 of effusion holes 222.

A second group 406 is adjacent the second edge 226 of the combustor dome 220, and the effusion holes 222 of the second group 406 have an orientation that is approximately completely radial. In other words, the second group 406 includes effusion holes 222 with angles of approximately 0° relative to a radial direction and can direct cooling air toward the outer edge 226, as indicated by arrow 416. As such, the arrow 416 corresponds to the direction of the cooling air from the second group 406 of effusion holes 222 and further corresponds to the outer combustion stream 294 of FIG. 2, which is encouraged in the depicted direction by the cooling air flowing through the second group 406 of effusion holes 222. In some embodiments, the effusion holes 222 in groups 402 and 406 may not be completely radial. As an example, the effusion holes 222 in groups 402 and 406 may be between about 0° to 45° in the radial direction, such that the bifurcated streams 292 and 294 develop appropriately, as discussed above.

A transition (or third) group 404 of effusion holes 222 is arranged radially between the first group 402 and the second group 406. The effusion holes 222 of the third group 404 have orientations that function to transition cooling air (and combustion gases) into the radial directions of the first and second groups 402 and 406, as indicated by the arrows 414. In some embodiments, the third group 204 of effusion holes 222 may have a tangential component to even out the temperature distribution along the circumference of the combustion chamber 214 (FIG. 2) and/or to increase residence time on the combustor dome 220. In other embodiments, the third group 204 of effusion holes 222 may be omitted.

In general and additionally referring to FIG. 2, the first, second, and third groups 402, 404, and 406 may have any number of rows and densities that achieve the desired bifurcation of the combustion streams 292 and 294. For example, if the combustion streams 292 and 294 are to be equal in flow rate, volume and/or velocity, the first and second groups 402 and 406 may have an equal number of effusion holes 222, whereas a greater number of effusion holes 222 in the one of the groups 402 or 406 may lead to a larger combustion stream 292 or 294. As such, the cooling air from the effusion holes 222 tends to encourage the combustion streams 292 and 294 in the desired direction while cooling the combustor dome 220 and minimizing interaction with the combustion process. As such, the combustion streams 292 and 294 may have an equal flow split at the radial midline of the combustor dome 220. However, the combustion streams 292 and 294 may have different predetermined ratios at positions other than the radial midline. For example, the combustion streams 292 and 294 may have a flow rate split of 75/25.

Figure 6:
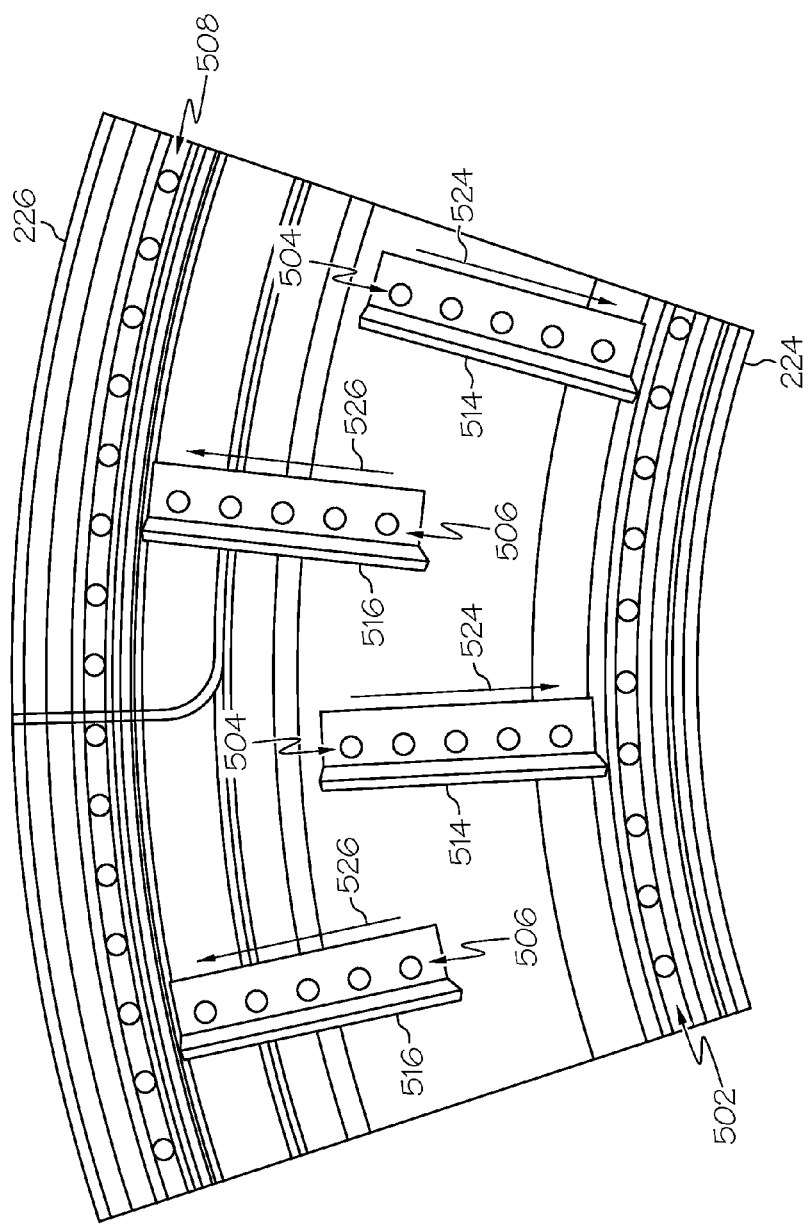
FIG. 6 is a partial cross-sectional view of the combustor of FIG. 2 through line 5-5 in accordance with an alternate exemplary embodiment.

FIG. 5 depicts a first embodiment of the combustor dome 220 that functions to bifurcate the combustion streams 292 and 294 (FIG. 2) with the arrangement of the effusion holes 222, although any mechanism for accomplishing this function may be provided. In general, any combination of structure that results in appropriate amount of air flow, direction of air flow, and gradients may be provided to bifurcate the combustion streams 292 and 294. As another example, FIG. 6 is a partial cross-sectional view of the combustor 160 of FIG. 2 through line 5-5 in accordance with an alternate exemplary embodiment. In the embodiment of FIG. 6, the combustor dome 220 is provided with four groups 502, 504, 506, and 508 of effusion holes 222. The first group 502 of effusion holes 222 is adjacent the first edge 224 and includes effusion holes 222 generally arranged in a circumferential or tangential row. Similarly, the second group 508 of effusion holes 222 is adjacent the second edge 226 and includes effusion holes 222 generally arranged in a circumferential or tangential row.

The third and fourth groups 504 and 506 are each arranged in radial rows, and each of the rows is associated with a louver (or baffle) 514 and 516. The louvers 514 and 516 are mounted or otherwise formed on the combustor dome 220 and extend into the combustion chamber 214 (FIG. 2) in an axial direction. The arrangement of the third group 504 and associated louvers 514 are circumferentially offset or clocked relative to the arrangement of the fourth group 506 and associated louvers 516 in an alternating pattern.

The louvers 514 and 516 may extend to any desired length, such as about 50% or 60% of the radial span of the combustor dome 220, and in one exemplary embodiment, are about the same length as the respective groups 504 and 506 of effusion holes 222. The length and arrangement of the louvers 514 and 516 influence the direction of the cooling flow from the effusion holes 222. Particularly, the arrangement of the third groups 504 and louvers 514 tend to direct cooling air in a radial direction toward the first edge 224, as indicated by the arrows 524, and the arrangement of the fourth groups 506 and louvers 516 tend to direct cooling air in a radial direction toward the second edge 226, as indicated by the arrows 526.

The cooling air flows 524 and 526 resulting from arrangement of the third and fourth groups 504 and 506, as well as the associated louvers 514 and 516, function to bifurcate the combustion streams 292 and 294 (FIG. 2), as described above. Given the equal spacing of the louvers 514 and 516 and the third and fourth groups 504 and 506, the cooling air flows 524 and 526 (and thus the combustion streams 292 and 294 of FIG. 2) are generally equal, although any other proportion may be provided.

The louvers 514 and 516 may be a single radial leg, as shown, or in other embodiments may be U-shaped opening in the direction of the intended direction of air flow. Generally, the number, geometry, and arrangement of the louvers 514 and 516 may be optimized to increase the effectiveness of the bifrucation and/or cooling of the combustor dome 220. The arrangement of louvers 514 and 516 particularly reduces the amount of cross-flow and/or flow in a circumferential direction that may reduce cooling and bifrucaton efficiency. Generally, the dimensions of the louvers 514 and 516 may vary depending on the dimensions of the combustor dome 220, the cooling requirements, the desired bifucation characteristics, and manufacturing or maintenance limitations.

In the depicted embodiment, the effusion holes 222 of FIG. 5 are oriented to direct the cooling air at an angle perpendicular to the surface of the combustor dome 220. However, in other embodiments, the direction of the effusion holes 222 of FIG. 6 may be oriented to direct cooling air in any desired direction, such as discussed above in reference to FIG. 5.

Figure 7:
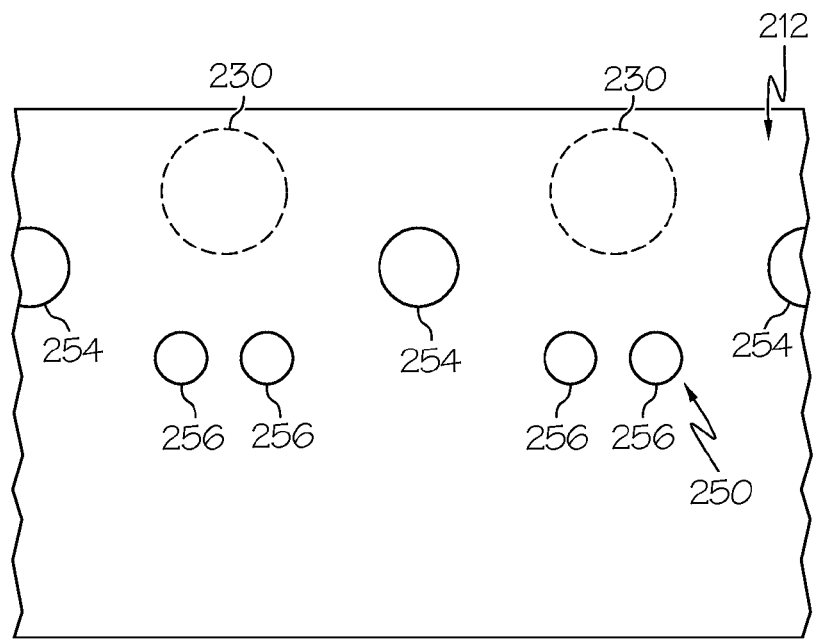
FIG. 7 is a partial plan view of an inner surface of an outer liner of the combustor of FIG. 2.
Figure 8:
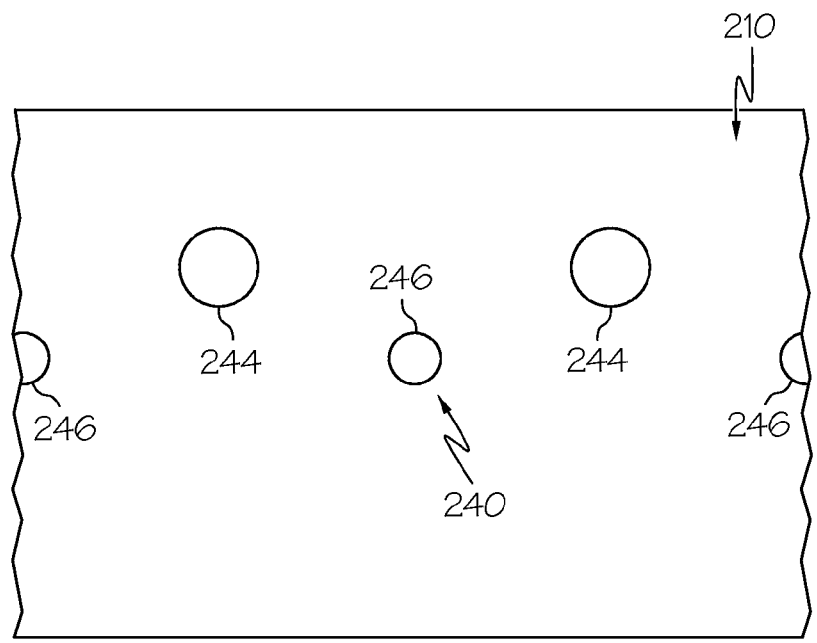
FIG. 8 is a partial plan view of an inner surface of an inner liner of the combustor of FIG. 2.
Figure 9:
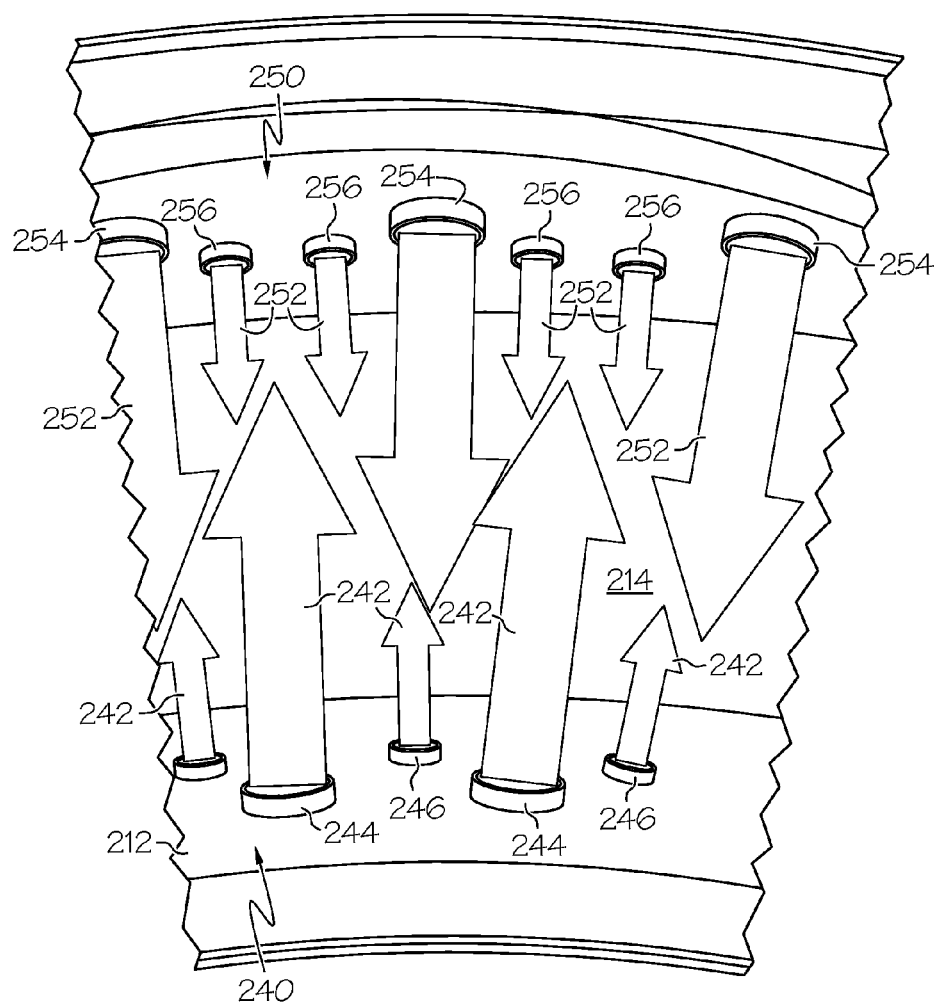
FIG. 9 is a partial cross-sectional view of the combustor of FIG. 2 through line 9-9.

FIGS. 7-9 illustrate further details about the quench zone Q of the combustor 160 and are collectively discussed below. FIG. 7 is a partial plan view of an inner surface of the outer liner 212 of the combustor 160 of FIG. 2. FIG. 7 schematically shows the position of the fuel injectors 230 and the quench air admission holes 250. In the embodiment of FIG. 7, the quench air admission holes 250 include a first tangential or circumferential row 254 of quench air admission holes 250 and a second tangential or circumferential row 256 of quench air admission holes 250 that are downstream of the first row 254. As shown, the quench air admission holes 250 of the first row 254 may be relatively larger than the quench air admission holes 250 of the second row 256.

FIG. 8 is a partial plan view of an inner surface of the inner liner 210 of the combustor 160 of FIG. 2 and schematically shows the position of the quench air admission holes 240. In the embodiment of FIG. 8, the quench air admission holes 240 include a first tangential or circumferential row 244 of quench air admission holes 240 and a second tangential or circumferential row 246 of quench air admission holes 240 that are downstream of the first row 244. As shown, the quench air admission holes 240 of the first row 244 may be relatively larger than the quench air admission holes 240 of the second row 246.

FIG. 9 is a cross-sectional view of the combustor 160 of FIG. 2 through line 8-8. FIG. 9 particularly shows the quench air admission holes 240 and 250 discussed above in FIGS. 7 and 8. FIG. 9 further schematically displays the quench jets 242 and 252 that respectively flow through the quench air admission holes 240 and 250. In general, the quench jets 242 flowing through the first row 244 of quench air admission holes 240 are circumferentially or tangentially offset relative to the quench jets 252 flowing through the first row 254 of quench air admission holes 250, and the quench jets 242 flowing through the second row 246 are circumferential or tangentially offset with respect to the quench jets 252 flowing through the second row 256. For example, the quench jets 252 are tangentially adjacent to the quench jets 242, and not directly opposite one another. At least some of the quench jets 242 and 252, particularly the quench jets 242 and 252 from the major holes of the first rows 244 and 254, may radially penetrate the combustion chamber 214 more than 50% of the radial depth.

As also shown in FIG. 9, the sizes of the quench jets 242 and 252 may be axially aligned or offset with opposing quench jets 242 and 252 with respect to both position and size. For example, the quench jets 252 from the first row 254 of quench air admission holes 250 are generally axially aligned with the quench jets 242 from the second row 246 of quench air admission holes 240. As another example, the two quench jets 252 from the second row 256 of quench air admission holes 250 are centered around each quench jets 242 from the first row 244 of quench air admission holes 240. As such, in the depicted embodiments, the quench air admission holes 240 and 250 may be circumferentially offset between the inner and outer liners 210 and 212 and staggered between relatively larger holes and relatively smaller holes. Accordingly, the quench air admission holes 240 and 250 produce quench jets 242 and 252 in an interleaved and over-penetrating pattern to ensure rapid mixing in the quench zone Q. In other embodiments, the quench air admission holes 240 and 250 may be have any suitable sizes and patterns.

This arrangement may result in a more even temperature profile and reduce NOx emissions by providing more desirable stoichiometric conditions. Particularly, this configuration ensures that dilution air spans radially across the entire combustion chamber annulus and that the combustion gases are properly quenched. At least some of the quench air admission holes 240 and 250 are "plunged." In other words, a rim portion of the quench air admission holes 240 and 250 extends into the combustion chamber 214. The plunged characteristics of the quench air admission holes 240 and 250 assist in the quench jets 242 and 252 in penetrating to the desired depth, as discussed above. Moreover, in one exemplary embodiment, the outer and inner liners 210 and 212 have effusion holes (not shown) that provide a cooling layer of air on the combustor side of the combustion chamber 214. In some exemplary embodiments, the plunged quench air admission holes 240 and 250 decrease or eliminate any interference with the effusion cooling layer. The quench air admission holes 240 and 250 are formed from a single piece, either punched or molded into the liner 210 and 212, or as an insert. Although the air admission holes 240 and 250 are depicted as plunged air admission holes 240 and 250, in other embodiments, the air admission holes are not plunged.

Accordingly, exemplary embodiments discussed herein provide improved NOx emission and temperature characteristics by maintaining a desired stoichiometry in the RQL combustor 160. This further functions to even out temperature distributions and increase cooling effectiveness, thus resulting in increased durability and operational efficiency. Exemplary embodiments may find beneficial use in many industries, including aerospace, automotive, and plant operations, and in many applications, including electricity generation, naval propulsion, pumping sets for gas and oil transmission, aircraft propulsion, automobile engines, and stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A reverse-flow annular combustor for a gas turbine engine, comprising:
    an inner liner;
    an outer liner circumscribing the inner liner; and
    a combustor dome having a first edge coupled to the inner liner and a second edge coupled to the outer liner, the combustor dome being a hemispherical combustor dome and forming a combustion chamber with the inner liner and the outer liner, wherein the combustion chamber receives air flow through the inner and outer liners, and wherein the combustor dome is configured to bifurcate the air flow at the combustor dome into two streams, including a first stream directed to the inner liner and a second stream directed to the outer liner,
    wherein the combustor dome defines a first group of effusion holes and a second group of effusion holes, the first group of effusion holes being oriented in a first substantially radial direction towards the inner liner and the second group of effusion holes being oriented in a second substantially radial direction towards the outer liner, and wherein the first group of effusion holes is adjacent the first edge and the second group of effusion holes is adjacent the second edge.

2. The combustor of claim 1, wherein the combustor dome is configured to bifurcate the combustion gases such that the first combustion stream and second combustion stream have flow rates approximately equal to one another.

3. The combustor of claim 1, wherein the combustor is an annular combustor about an engine centerline, and wherein the combustor dome defines a third group of effusion holes arranged between the first group of effusion holes and the second group of effusion holes, the third group being at least partially oriented in a tangential direction relative to the engine centerline.

4. The combustor of claim 1, wherein the combustor dome further defines a first radial row of effusion holes extending from adjacent the first edge and a second radial row of effusion holes extending from adjacent the second edge, and wherein the first radial row of effusion holes is configured to direct the first combustion stream to the inner liner and the second radial row of effusion holes is configured to direct the second combustion stream to the outer liner.

5. The combustor of claim 4, further comprising a first louver mounted on the combustor dome adjacent to the first radial row of effusion holes and a second louver mounted on the combustor dome adjacent to the second radial row of effusion holes, wherein each of the first and second louvers is mounted on the combustor dome and extends along the surface of the combustor dome in a radial orientation.

6. The combustor of claim 5, wherein the first louver and the first radial row have lengths that are approximately equal.

7. The combustor of claim 1, wherein the combustor is an annular combustor about an engine centerline, and wherein the annular combustor further comprises a fuel injector coupled to the outer liner and configured to inject a stream of fuel into the combustion chamber in a tangential direction relative to the engine centerline.

8. The combustor of claim 1, wherein the combustion chamber defines at least a rich burn zone and a quench zone.

9. The combustor of claim 8, further comprising a first row of air admission holes in the inner liner and a second row of air admission holes in the outer liner, the first set of air admission holes configured to admit a first set of quench jets into the quench zone and the second set of air admission holes configured to admit a second set of quench jets into the quench zone, the first row of air admission holes being circumferentially offset relative to the second row of air admission holes.

10. The combustor of claim 9, wherein the first row of air admission holes is axially aligned with the second row of air admission holes.

11. The combustor of claim 9, wherein the combustor chamber defines a width, and wherein the first row of air admission holes is configured to admit the first set of quench jets to at least 50% of the width of the combustor chamber and the second row of air admission holes is configured to admit the second set of quench jets to at least 50% of the width of the combustor chamber.

12. The combustor of claim 8, further comprising a third row of air admission holes in the inner liner and a fourth row of air admission holes in the outer liner, the third row of air admission holes configured to admit a first set of dilution jets into the dilution zone and the fourth set of air admission holes configured to admit a second set of dilution jets into the dilution zone.

13. A reverse-flow annular combustor for a gas turbine engine with an engine centerline, comprising:
   an inner liner;
   an outer liner circumscribing the inner liner;
   a combustor dome having a first edge coupled to the inner liner and a second edge coupled to the outer liner, the combustor dome being a hemispherical combustor dome and forming a combustion chamber with the inner liner and the outer liner, wherein the combustion chamber defines a rich burn zone, a quench zone, and a lean burn zone to support combustion of air flow through to inner liner and the outer liner;
   a first row of air admission holes in the inner liner configured to admit a first set of quench jets into the quench zone;
   a second row of air admission holes in the outer liner configured to admit a second set of quench jets into the quench zone, the first row of air admission holes being circumferentially offset relative to the second row of air admission holes;
   a third row of air admission holes in the inner liner configured to admit a first set of dilution jets into the dilution zone;
   a fourth row of air admission holes in the outer liner configured to admit a second set of dilution jets into the dilution zone; and
   a fuel injector coupled to the outer liner and configured to inject a stream of fuel into the combustion chamber in a tangential direction relative to the engine centerline,
   wherein the combustor dome is configured to bifurcate the air flow at the combustor dome into two streams, including a first combustion stream directed to the inner liner and a second combustion stream directed to the outer liner.

14. The combustor of claim 13, wherein the combustor dome is configured to bifurcate the air flow at the combustor dome such that the first combustion stream and second combustion stream have flow rates approximately equal to one another.

15. The combustor of claim 13, wherein the combustor dome defines a first group of effusion holes and a second group of effusion holes, the first group of effusion holes being oriented in a first radial direction towards the inner liner and the second group of effusion holes being oriented in a second radial direction towards the outer liner.

16. The combustor of claim 13, wherein the combustor dome further defines a first radial row of effusion holes extending from adjacent the first edge, a second radial row of effusion holes extending from adjacent the second edge, a first louver mounted on the combustor dome adjacent to the first radial row of effusion holes, and a second louver mounted on the combustor dome adjacent to the second radial row of effusion holes, and
   wherein the first radial row of effusion holes and the first louver are configured to direct the first combustion stream to the inner liner and the second radial row of effusion holes and the second louver are configured to direct the second combustion stream to the outer liner.

17. The combustor of claim 5, wherein the combustor dome has a radial span defined between the first edge and the second edge, and wherein each of the first and second louvers have a length to extend approximately in the radial direction at least 50% of the radial span of the combustor dome.

18. The combustor of claim 1, wherein the further comprising a fuel injector coupled to the outer liner, separate from the combustor dome and upstream of the second edge of the combustor dome, the fuel injector configured to inject a stream of fuel into the combustion chamber, the stream of fuel having an upstream axial component toward the combustor dome and a tangential component with respect to an engine centerline.

19. The combustor of claim 1, wherein the first group of effusion cooling holes are aligned with the first stream and the second group of effusion cooling holes are aligned with the second stream such that the air flow is bifurcated along the surface of the combustor dome, and wherein each of the first group of effusion cooling holes and the second group of effusion cooling holes have a diameter of approximately 0.01 inches to approximately 0.04 inches.

* * * * *